United States Patent
Zhao et al.

(10) Patent No.: US 10,807,305 B2
(45) Date of Patent: Oct. 20, 2020

(54) SACRIFICIAL OBJECTS BASED ON A TEMPERATURE THRESHOLD

(71) Applicant: Hewlett-Packard Development Company, L.P., Houston, TX (US)

(72) Inventors: Yan Zhao, Palo Alto, CA (US); Hou T. Ng, Palo Alto, CA (US); Alejandro Manuel De Pena, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 220 days.

(21) Appl. No.: 15/565,850

(22) PCT Filed: Jun. 2, 2015

(86) PCT No.: PCT/US2015/033768
§ 371 (c)(1),
(2) Date: Oct. 11, 2017

(87) PCT Pub. No.: WO2016/195665
PCT Pub. Date: Dec. 8, 2016

(65) Prior Publication Data
US 2018/0111320 A1    Apr. 26, 2018

(51) Int. Cl.
*B29C 64/386*    (2017.01)
*B33Y 50/00*    (2015.01)
(Continued)

(52) U.S. Cl.
CPC .......... *B29C 64/165* (2017.08); *B33Y 50/00* (2014.12); *G05B 19/4099* (2013.01);
(Continued)

(58) Field of Classification Search
CPC ... B29C 64/386; B29C 64/153; B29C 64/165; G05B 19/4099; G05B 2219/49007;
(Continued)

(56) References Cited

U.S. PATENT DOCUMENTS 6,410,105 B1    6/2002 Mazumder et al.
6,930,278 B1 *  8/2005 Chung .................. B23K 26/34
                                                  219/121.85

(Continued)

OTHER PUBLICATIONS

Lu, L. et al., "A Layer-To-Layer Model and Feedback Control of Ink-Jet 3-D Printing", 1083-4435, 2014, IEEE. http://ieeexplore.ieee.org/stamp/stamp.jsp?tp=&arnumber=6967814.

(Continued)

*Primary Examiner* — Kenneth M Lo
*Assistant Examiner* — Mohammed Shafayet
(74) *Attorney, Agent, or Firm* — HP Inc. Patent Department (57) ABSTRACT

In one implementation, a system comprising a target engine, a thermal engine, and a sacrificial object engine is described. The target engine is to identify a target region of a build bed of a print device where a target object is to be located. The thermal engine is to identify a temperature level of the target region. The sacrificial object engine is to identify an object location to place a sacrificial object in response to a determination that the temperature level of the target region is deficient to achieve a temperature threshold for production.

15 Claims, 7 Drawing Sheets

(51) Int. Cl.
*G05B 19/4099* (2006.01)
*B33Y 10/00* (2015.01)
*B33Y 50/02* (2015.01)
*B22F 3/105* (2006.01)
*B33Y 30/00* (2015.01)
*B29C 64/153* (2017.01)
*B29C 64/165* (2017.01)

(52) U.S. Cl.
CPC .............. *B22F 2003/1057* (2013.01); *B22F 2003/1058* (2013.01); *B29C 64/153* (2017.08); *B33Y 10/00* (2014.12); *B33Y 30/00* (2014.12); *B33Y 50/02* (2014.12); *G05B 2219/35134* (2013.01); *G05B 2219/49007* (2013.01); *Y02P 10/295* (2015.11)

(58) Field of Classification Search
CPC .......... G05B 2219/35134; B33Y 50/02; B33Y 50/00; B33Y 30/00; B33Y 10/00; Y02P 10/295; B22F 2003/1058; B22F 2003/1057
USPC ........................................................ 700/98
See application file for complete search history.

(56) References Cited

U.S. PATENT DOCUMENTS

| | | | |
|---|---|---|---|
| 10,137,644 B2* | 11/2018 | de Pena | G05B 19/4099 |
| 2003/0059334 A1 | 3/2003 | Shen et al. | |
| 2004/0200816 A1* | 10/2004 | Chung | B33Y 30/00 219/121.83 |
| 2006/0119012 A1* | 6/2006 | Ruatta | C23C 24/10 264/497 |
| 2008/0050524 A1 | 2/2008 | Kumar et al. | |
| 2008/0262659 A1* | 10/2008 | Huskamp | G05D 23/1919 700/300 |
| 2009/0152771 A1 | 6/2009 | Philippi et al. | |
| 2010/0021638 A1* | 1/2010 | Varanka | B29C 64/112 427/271 |
| 2011/0190904 A1 | 8/2011 | Lechmann et al. | |
| 2012/0231175 A1 | 9/2012 | Tan | |
| 2013/0119577 A1 | 5/2013 | You et al. | |
| 2014/0034214 A1 | 2/2014 | Boyer er al. | |
| 2014/0249773 A1* | 9/2014 | Beuth, Jr. | B29C 37/005 702/155 |
| 2014/0314613 A1* | 10/2014 | Hopkinson | B22F 3/1055 419/55 |
| 2015/0006126 A1* | 1/2015 | Taguchi | G06K 9/00214 703/2 |
| 2015/0021379 A1* | 1/2015 | Albrecht | B05B 5/001 228/256 |
| 2015/0314528 A1* | 11/2015 | Gordon | B33Y 30/00 264/401 |
| 2016/0096326 A1* | 4/2016 | Naware | B29C 64/106 425/143 |
| 2016/0167132 A1* | 6/2016 | Panat | H01M 4/13 419/53 |
| 2016/0176118 A1* | 6/2016 | Reese | B29C 64/40 425/89 |
| 2017/0151722 A1* | 6/2017 | Prasad | B29C 64/165 |

OTHER PUBLICATIONS

International Search Report and Written Opinion dated Mar. 2, 2016, PCT Patent Application No. PCT/US2015/033768, filed Jun. 2, 2015, Korean Intellectual Property Office.

* cited by examiner

SACRIFICIAL OBJECTS BASED ON A TEMPERATURE THRESHOLD

CLAIM FOR PRIORITY

The present application is a national stage filing under 35 U.S.C. § 371 of PCT application number PCT/US2015/033768, having an international filing date of Jun. 2, 2015, the disclosure of which is hereby incorporated by reference in its entirety.

BACKGROUND

Three-dimensional (3D) printing may allow for objects to be printed in 3D space. 3D printing is a form of solid freeform fabrication that may enable the generation of 3D objects including final products, prototype parts, and working tools. There are many forms of 3D printing in terms of techniques and printable materials. 3D printing techniques may utilize an additive process in which an object (described by electronic data) is bunt layer by layer from base materials. For example, an object model of an object may have voxel information and be sliced into layers to allow a print device to print a cross section slice of the object as a first layer and build a second layer on top of the first layer until the final object is produced. Energy may be applied to fuse the final materials together and/or the materials may be left to cool or otherwise stabilize to form the 3D object.

DETAILED DESCRIPTION

In the following description and figures, some example implementations of apparatus, systems, and/or methods for temperature adjustment of a print device environment are described as well as printed articles produced by such example implementations. In examples described herein, a "print device" may be a device to print content on a physical medium (e.g., paper or a layer of powder-based build material, etc.) with a printing fluid (e.g., ink) or toner. In the case of printing on a layer of powder-based build material, the print device may utilize the deposition of printing fluids in a layer-wise additive manufacturing process. A print device may utilize suitable printing consumables, such as ink, toner, fluids or powders, or other raw materials for printing. In examples described herein, a print device may be a three dimensional (3D) object forming device.

The 3D printing technology descriptions discussed herein may be particular to technique and/or material type, but are used merely to provide examples, and the description herein is applicable across various 3D printing technologies, environments, and materials. An example 3D print technology discussed herein may dispense ink or other suitable coalescing agent onto a layer of build material (e.g., a bed layer of powder material) in a desired pattern and then may expose the area with energy from a material fusing source, such as a heat source. Electromagnetic radiation absorbing components in the coalescing agent absorb and generate heat that sinters, melts, or otherwise coalesces the patterned build material. This may allow the patterned build material to solidify and form a cross-section of the desired final object (e.g., a printed article). For example, in selective laser sintering (SLS) technology, the building material may be confined in a closed system (e.g., to reduce the temperature non-uniformity) and heated uniformly using a heat source. During the solidification process, non-uniform temperature distribution or unbalanced thermal stress may cause warpage in the target part, which affects the dimensional accuracy of the final object(s). The warpage problem may be more sever for larger parts due to, for example, difficulty in maintaining a uniform temperature across the entire part and generally maintain uniformity across a large printing area.

Various examples described below relate to identifying locations to place sacrificial objects near a target object. By deploying sacrificial parts at strategic locations in the build bed, additional heating from the sacrificial object may be dynamically provided to the target model geometry which may, for example, increase temperature uniformity within the printing environment and may, for example, avoid physical warpage of the target object during production.

The terms "include," "have," and variations thereof, as used herein, mean the same as the term "comprise" or appropriate variation thereof. Furthermore, the term "based on," as used herein, means "based at least in part on." Thus, a feature that is described as based on some stimulus may be based only on the stimulus or a combination of stimuli including the stimulus.

Figure 1A:
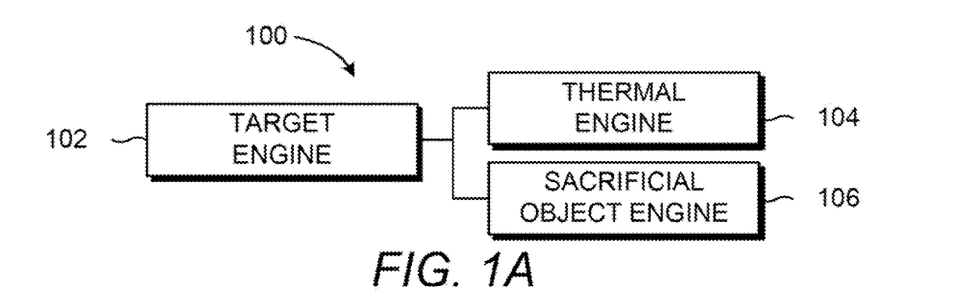
FIGS. 1A and 1B are block diagrams depicting example systems for temperature adjustment of a print device environment.
Figure 1B:
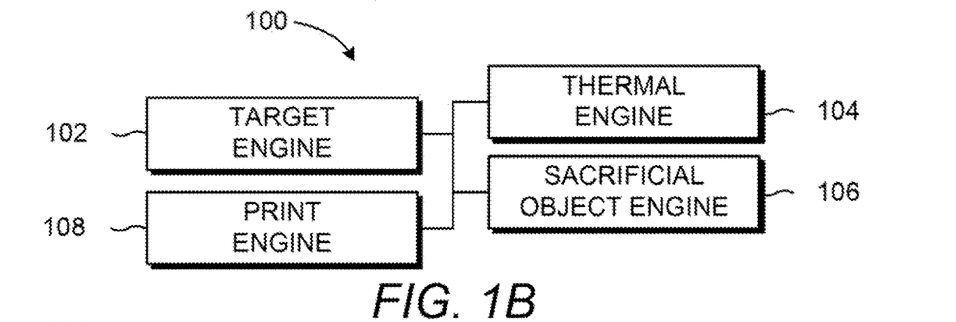

FIGS. 1A and 1B are block diagrams depicting example systems for temperature adjustment of a print device environment. Referring to FIG. 1A, the example system 100 of FIG. 1A generally includes a target engine 102, a thermal engine 104, and a sacrificial object engine 106. In general, the sacrificial object engine 106 may identify a location to place a sacrificial object based on the target model geometry and a temperature of the print device environment identified by the target engine 102 and the thermal engine 104. As shown in FIG. 1B, the system 100 may also include a print engine 108.

Referring to FIGS. 1A and 1B, the target engine 102 represents any circuitry or combination of circuitry and executable instructions to identify a target region of a build bed of a print device where a target object is to be located. A build bed, as used herein, refers to an area of the print device where print material is deposited. The build bed may refer to a layer of powder (i.e., a powder bed) on which a coalescing agent is deposited. As used herein, the target region represents a section of the build bed where the target object is going to be formed. For example, the target region may refer to a two-dimensional (2D) area of layer information for a slice of the target object or a 3D volume of the target object. As used herein, a "target object" represents a printable object produceable by the print device and the "target object model" refers to the data that represents the 3D object to be built in the build volume to form the target object. Examples of target object model data include a 3D model data file provided in a print job, data comprising a 3D model before rasterization and slicing of the 3D model is performed, and data of a layer of the 3D model if the target object is being analyzed during production. As used herein, a print material is a material used by the print device to form an object, such as build material, print fluid, or a combination thereof.

Figure 4:
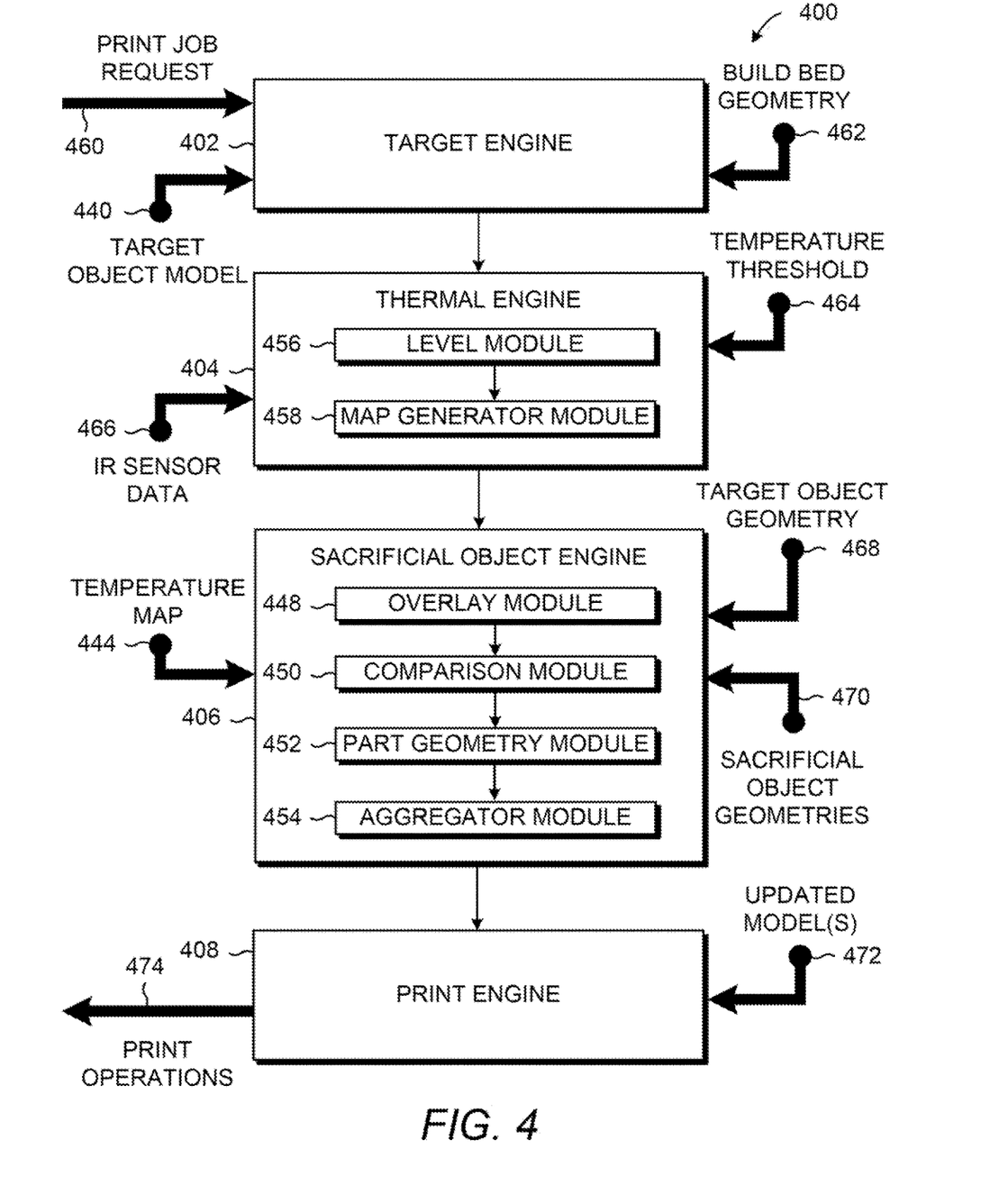
FIG. 4 depicts example modules used to implement example systems for temperature adjustment of a print device environment.

The target object model may be used by the target engine 102 to identify where the target object may be formed on the build bed. For example, the geometry of the target object may be identified by the data of the target object model either directly using vector information or indirectly based on analysis of the voxel information. For another example, an outline of the target object on the build bed may be identified at each layer where the outline is compared to the position on the build bed of the print device. The build bed geometry may be used as a reference point to identify the perimeter of the target object (or otherwise outline the geometry of the target object) and identify areas of the build bed where the target object is to be formed. FIG. 4 provides an example of the target engine 402 receiving a build bed geometry 462 and a target model data 440 to compare and identify the geometry of the target object model on the build bed. The thermal engine 106 may then be used, for example, to map temperature data on the geometry of the build bed to compare the temperature data with the geometry of the target object, as discussed further below.

The thermal engine 104 represents any circuitry or combination of circuitry and executable instructions to identify a temperature level of the target region. The temperature level, as used herein, comprises a predicted temperature during production of the target object by the print device. The predicted temperature may be based on previous print jobs or known temperature information with regards to print device environment of the print device. The print device environment, as used herein, represents the conditions of the area where the print device forms an object. For example, the print device environment comprises the condition of the build bed, the temperature surrounding the build bed, and the temperature at which print material is discharged from a marking device of the print device. The print device environment may be within an open system that allows the print environment to be affected by external sources or a closed system that seals or otherwise confines the print environment to protect from effects of external sources.

The temperature level may be identified at the target region by determining a predicted temperature at the location of the build bed using a thermal model and the target object model. For example, at a location where target object is to be printed, a temperature value of the target may be calculated (e.g., using a thermal model function) based on the size of the target object and/or the thermal properties of the print material in addition to any sources of heat within the print device environment, such as a heat lamp. For another example, the temperature level may be identified by generating a temperature map of the build bed using modeled thermal data using a thermal model function (with or without the target object taken into account), and then compare the temperature map to the geometry of the target object. In that example, regions of temperature levels (e.g., temperature ranges) may be identified based on a thermal model of the build bed. The regions of the temperature map may be based on a temperature threshold for production using the print material. For example, the temperature threshold may comprise a target temperature range that depends on a thermal property of the print material used by the print device, such as a melting point or a crystallization point, and the temperature map could identify a boundary of a temperature level threshold region that encompasses an area or section that is within the target temperature range. The temperature threshold represents any appropriate value that represents a temperature and designates the temperature of a print device environment at which a target object is able to properly form. The temperature threshold may be a maximum temperature, a minimum temperature, a range of temperatures, or a combination thereof, and may define a "sweet spot" temperature and/or temperature tolerance for a print device environment to, for example, form accurate representations of an input 3D model of a print job.

The thermal engine 104 may measure actual temperature data at a surface area of the build bed during production, such as by using an infrared (IR) sensor. For example, the temperature data (such as the temperature level and temperature map) may be verified using an IR camera of the print device and the IR camera may notify the system 100 to recalculate the predicted temperature level. FIG. 4 depicts the thermal engine 404 receiving the temperature threshold 464 in making the determination of whether a sacrificial object should be printed and receiving the IR sensor data 466 for verification that the temperature level is correct. This may be useful when placing initial sacrificial objects at level of the powder bed before any portions of the target object are printed or when implementing a system that may identify and form sacrificial objects during production. The thermal engine 104 may use the actual temperature data to verify the modeled temperature data is correct.

With the region of the target object identified and the temperature levels identified, a sacrificial object is placed appropriately to affect the temperature level at the target object. The sacrificial object engine 106 represents any circuitry or combination of circuitry and executable instructions to identify an object location to place a sacrificial object in response to a determination that the temperature level of the target region is deficient to achieve a temperature threshold for production (e.g., a temperature that allows the target object to remain at the geometry of the target object model). The temperature threshold may be a value, such as a maximum temperature or minimum temperature, or a range of values, such as a "sweet spot" temperature for proper fusion of a print material that comprises plus or minus five degrees from the desired fusing temperature. The temperature threshold is associated with a thermal property of a print material useable by the print device. For example, the thermal property of a first print material may determine the first print material is to cool at a slower rate than a thermal property of a second print material, and thus the temperature threshold may be a higher range for the first print material than the second print material. Example thermal properties of a print material include a melting point of the print material, a crystallization point of the print material, a viscosity of the print material at the temperature at which the print material is discharged, a heat transfer rate of the print material, a glass transition temperature, a decomposition temperature, etc. or a combination thereof.

As used herein, a "sacrificial object" refers to a printable object produceable by the print device that is not part of the target object and the "sacrificial object model" represents the data that represents the 3D object to be built in the build volume to form the sacrificial object. The sacrificial object is to provide heat or otherwise improve the temperature level of the area where the sacrificial object is located. For example, the sacrificial object may have a heat dissipation property associated with the thermal property of the print material and the temperature at which the print material is discharged onto the build bed, where the sacrificial object generally has a range at which it increases the ambient temperature surrounding the sacrificial object. In this manner, placing a sacrificial object so that the ambient temperature surrounding the target region is affected by the heat emission of the sacrificial object may, for example, avoid warpage due to temperature level of the target object, which without the sacrificial object, could be below the temperature threshold.

As depicted in FIG. 4, the sacrificial object engine 406 may receive target object geometry 468 and the temperature map 444 and may compare the temperature map to the target region and identify a sacrificial object region. As used herein, the sacrificial object region is a section of the build volume where sacrificial objects may be located. The sacrificial object region may comprise a difference between the target region and a temperature level area of the temperature map within the temperature threshold. In this manner, the comparison may identify that the target region is within the sacrificial object region (e.g., the target object is at least partially within a temperature region that is below the temperature threshold for production). The sacrificial object region may further be defined based on the characteristics of the print material and the print device environment. For example, the size of the sacrificial object region may be increased (e.g., multiplied) by an environmental factor to ensure the target object is sufficiently covered by the region and the area close to the target object may be removed from the sacrificial object region due to an overlap distance threshold. As used herein, the overlap distance threshold is a minimum distance between objects to ensure the objects do not merge (based on the thermal property of the print material). The overlap distance threshold may be used to identify a desired distance between the sacrificial object and the target object. In this manner, a sacrificial object model may be added to the target object model at no less than an overlap distance threshold from the target object perimeter.

The sacrificial object engine 106 may utilize simulations to identify the sacrificial object. For example, the sacrificial object engine 106 may perform iterations of a finite element method (FEM) simulation and simulated annealing operations to identify locations for multiple sacrificial objects to cover the sacrificial object region sufficiently to, for example, provide uniformity in temperature across the target object. In that example, the sacrificial object engine 106 may receive sacrificial object geometry information including a plurality of object geometries; perform a FEM simulation to generate a temperature map, set constraints for a simulated annealing operation that identifies a solution of sacrificial parts to achieve the temperature threshold in the target region, and iteratively perform FEM simulation updates and simulated annealing operations until at least one of the sacrificial object region achieves the temperature threshold and a number of iterations are performed (e.g., a maximum number of iterations to indicate a termination of the iterations). Simulated annealing operations represent an approximation simulation to determine a solution in an identified search space using probabilistic and/or heuristic designs. An example of an identified search space with regard to description herein is a domain of possible object locations for sacrificial objects that are within the bounds of the system 100 (e.g., defined by the sacrificial object region). For example, the domain of possible object locations (e.g., the sacrificial object region) may be a section of the build bed that is outside a temperature level threshold region based on a fusion property associated with a melting point of the print material and a crystallization point of the print material, outside an overlap distance threshold from the target object that exceeds a first distance where the sacrificial object and the target object would fuse together during production, and within a heat dissipation range of the sacrificial object that allows heat of the sacrificial object to affect a temperature of the target object model An example simulated annealing operation is a Monte-Carlo method of simulated annealing operations where a random sampling of numerical domain is performed until a solution is realized. In the context of the description herein, the simulated annealing operations are to identify object locations for sacrificial objects and the FEM simulation updates are to modify the temperature map based on the sacrificial objects added by the simulated annealing operations. An example Monte-Carlo method may randomly select a location within the sacrificial object region as the object location of the sacrificial object and place a predetermined geometry of a sacrificial object at the location in the target object model. Sacrificial object geometries may be predetermined in size and shape. For example, a plurality of sacrificial object geometries may include a bar and a plate where the bar represents a line of print material of a predetermined length and the plate represents a circular object of a predetermined diameter with a filled-in interior.

The final printed geometry may be different from the predetermined geometries by using a merge distance threshold similar to the overlap distance threshold. As used herein, the merge distance threshold represents a distance at which a plurality of objects are to be merged because the objects are so close together. For example, the merge distance threshold may be based on a thermal property of the print material where two objects at the distance are likely to be merged due to the thermal property of the print material. The sacrificial object engine 106 may merge a first sacrificial object with a second sacrificial object when a distance between the sacrificial object satisfies the merge distance threshold, and, thus, may create dynamic shapes that, for example, may align with the shape of the target object. For example, a plurality of sacrificial objects placed at the overlap distance threshold and placed within a merge distance threshold may be merged into a single, filled-in sacrificial object that follows the geometry bounds of the section comprising the area among the merged sacrificial objects. An example of merger of sacrificial objects is depicted in FIG. 5D and discussed further in the associated description. Alternatively or in addition, the sacrificial object engine 106 may change the object location of a first sacrificial object when a merge distance with a second sacrificial object is achieved to be beyond the merge distance with the second sacrificial object. Changes in the sacrificial objects by the sacrificial object engine 106 may be made based on a comparison of the temperature map, the geometry of the target object model, and/or a location of the plurality of sacrificial object models.

With the sacrificial objects modeled in their appropriate locations and added to the print job data (e.g., added to the target object model), the print job may begin using the print engine 108 of FIG. 1B. The print engine 108 represents any circuitry or combination of circuitry and executable instructions to cause the print device to print a layer of the sacrificial object. For example, the print engine 108 may be a combination of circuitry and executable instructions to cause actuation of a marking device of the print device to the object location, cause placement of an amount of the print material at the object location to from the sacrificial object, and cause application of energy to the object location to create the sacrificial object. The sacrificial object may be a different print material from the print material used to print the target object or the sacrificial object may be made of the same print material as that used to produce the target object.

Figure 2:
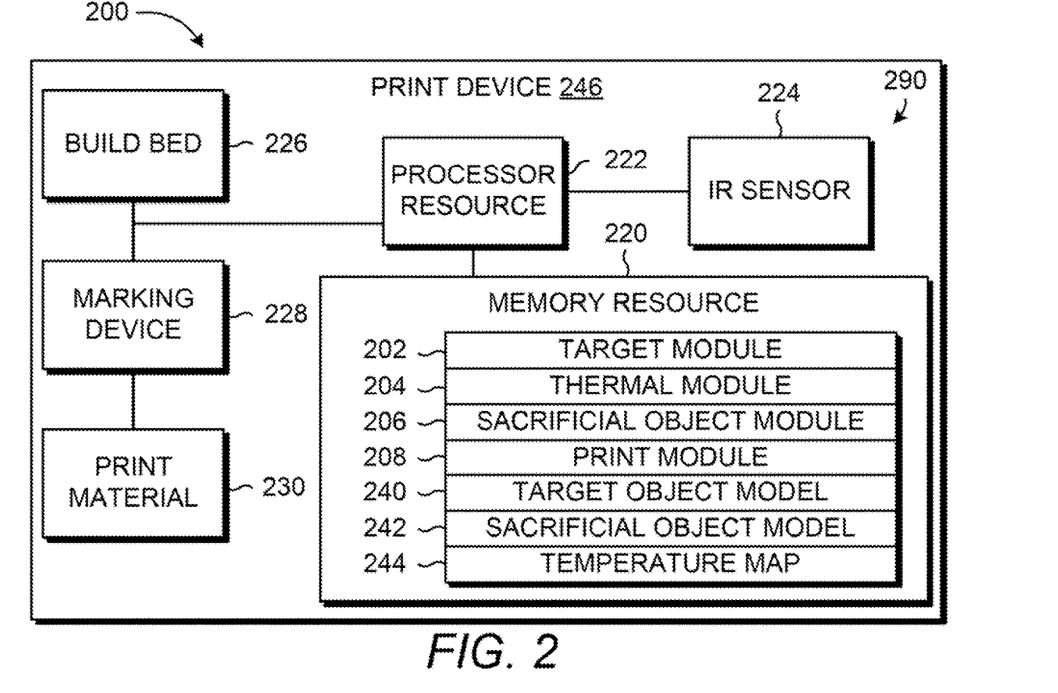
FIGS. 2 and 3 depicts example environments in which various systems for temperature adjustment of a print device environment may be implemented.
Figure 3:
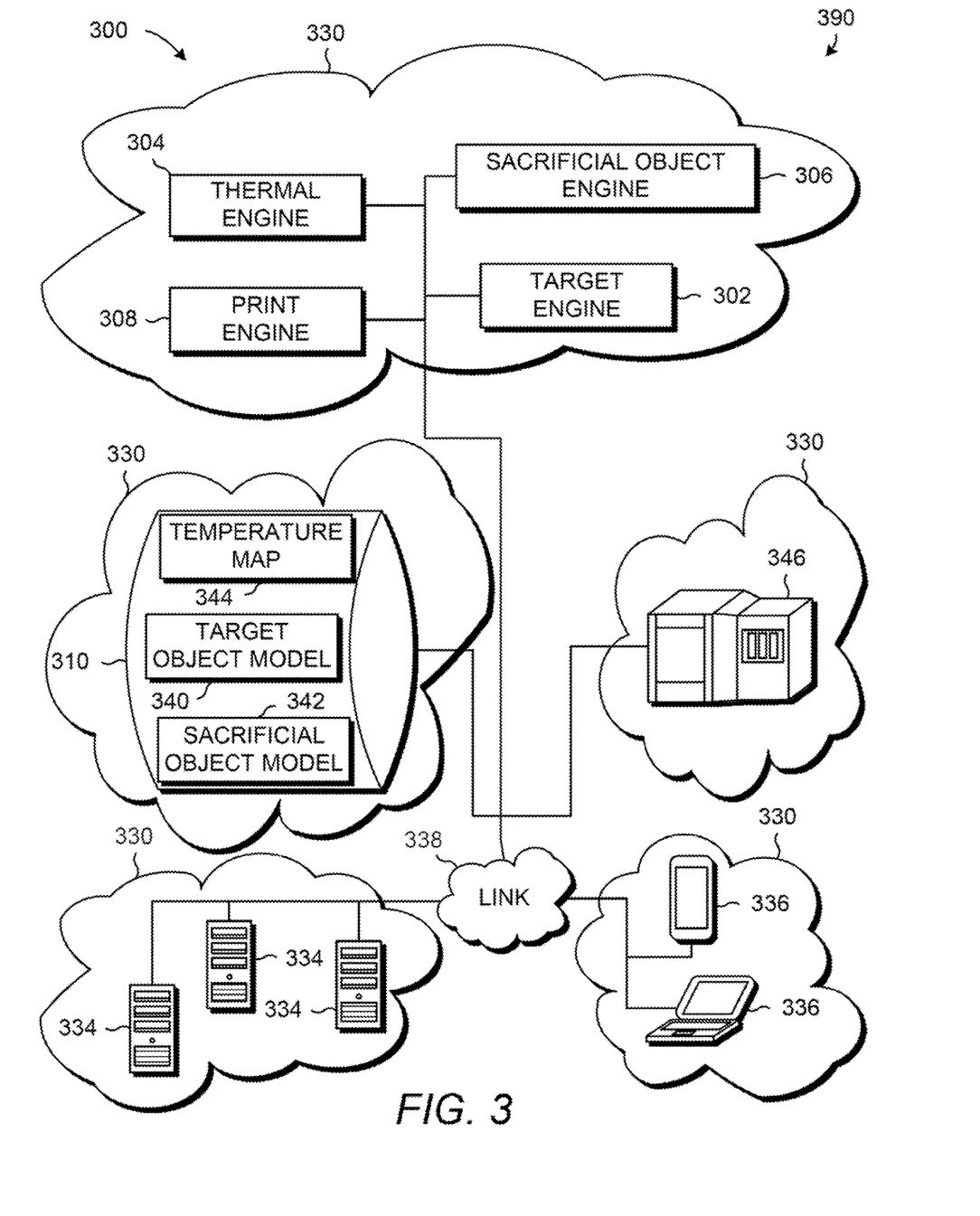

In some examples, functionalities described herein in relation to any of FIGS. 1-3 may be provided in combination with functionalities described herein in relation to any of FIGS. 4-8.

FIGS. 2 and 3 depict example environments 290 and 390 in which various systems 200 and 300 for temperature adjustment of a print device environment may be implemented. FIG. 2 depicts the example system 200 may comprise a memory resource 220 operatively coupled to a processor resource 222 within a print device 246. The processor resource 222 may be operatively coupled to components of the print device 246, such as the IR sensor 224, the build bed 226, the marking device 228, and a container of the print material 230. For example, the print device 246 may be a 3D object forming device that includes a machine-readable medium, such as memory resource 220, comprising executable instructions that when executed by a processor resource, such as processor resource 222, causes the print device 246 (e.g. the components of the print device 246) to generate a target object formed of print material and generate a sacrificial object formed of print material within a distance range that allows the heat of the sacrificial object to affect the thermal background of the target object.

Referring to FIG. 2, the memory resource 220 may contain a set of instructions that are executable by the processor resource 222 as well as any data used by the system 200. For example, the memory resource 220 may contain a set of instructions, a target object model 240, a sacrificial object model 242, and a temperature map 244. The set of instructions are operable to cause the processor resource 222 to perform operations of the system 200 when the set of instructions are executed by the processor resource 222. The set of instructions stored on the memory resource 220 may be represented as a target module 202, a thermal module 204, a sacrificial object module 206, and a print module 208. The target module 202, the thermal module 204, the sacrificial object module 206, and the print module 208 represent program instructions that when executed function as the target engine 102, the thermal engine 104, the sacrificial object engine 106, and the print engine 108 of FIG. 1B, respectively. The processor resource 222 may carry out a set of instructions to execute the modules 202, 204, 206, 208, and/or any other appropriate operations among and/or associated with the modules of the system 200. For example, the processor resource 222 may carry out a set of instructions to measure temperature data at a surface area of a build bed of print device, generate a thermal map from the temperature data containing a temperature level threshold region associated with a temperature threshold representing a temperature that depends on a print material property, identify a sacrificial object region that covers a portion of a target object model that is outside the temperature level threshold region, define a domain of possible object locations within the sacrificial object region, model a sacrificial object based on a boundary of the sacrificial object region and a sacrificial part geometry available to the print device, add sacrificial object model data to target object model data before slicing the target object model to prepare for printing the target object, and cause a printed article to be formed having a portion of the sacrificial object outside the temperature level threshold region and a distance from the target object that is greater than an overlap distance threshold and less than a heat dissipation threshold. For another example, the processor resource 222 may carry out a set of instructions to merge any of a plurality of sacrificial object models that achieve a merge distance threshold or change an object location of the sacrificial object when a merge distance threshold is achieved.

Although these particular modules and various other modules are illustrated and discussed in relation to FIG. 2 and other example implementations, other combinations or sub-combinations of modules may be included within other implementations. Said differently, although the modules illustrated in FIG. 2 and discussed in other example implementations perform specific functionalities in the examples discussed herein, these and other functionalities may be accomplished, implemented, or realized at different modules or at combinations of modules. For example, two or more modules illustrated and/or discussed as separate may be combined into a module that performs the functionalities discussed in relation to the two modules. As another example, functionalities performed at one module as discussed in relation to these examples may be performed at a different module or different modules. FIG. 4 depicts yet another example of how functionality may be organized into engines and/or modules.

The processor resource 222 is any appropriate circuitry capable of processing (e.g., computing) instructions, such as one or multiple processing elements capable of retrieving instructions from the memory resource 220 and executing those instructions. For example, the processor resource 222 may be a central processing unit (CPU) that enables temperature adjustment of a print device environment by fetching, decoding, and executing modules 202, 204, 206, and 208. Example processor resources 222 include at least one CPU, a semiconductor-based microprocessor, a programmable logic device (PLD), and the like. Example PLDs include an application specific integrated circuit (ASIC), a field-programmable gate array (FPGA), a programmable array logic (PAL), a complex programmable logic device (CPLD), and an erasable programmable logic device (EPLD). The processor resource 222 may include multiple processing elements that are integrated in a single device or distributed across devices. The processor resource 222 may process the instructions serially, concurrently, or in partial concurrence.

The memory resource 220 represents a medium to store data utilized and/or produced by the system 200. The medium is any non-transitory medium or combination of non-transitory media able to electronically store data, such as modules of the system 200 and/or data used by the system 200. For example, the medium may be a storage medium, which is distinct from a transitory transmission medium, such as a signal. The medium may be machine-readable, such as computer-readable. The medium may be an electronic, magnetic, optical, or other physical storage device that is capable of containing (i.e., storing) executable instructions. The memory resource 220 may be said to store program instructions that when executed by the processor resource 222 cause the processor resource 222 to implement functionality of the system 200 of FIG. 2. The memory resource 220 may be integrated in the same device as the processor resource 222 or it may be separate but accessible to that device and the processor resource 222. The memory resource 220 may be distributed across devices. The memory resource 220 may include representations of data and/or information mentioned herein.

In the discussion herein, the engines 102, 104, 106, and 108 of FIGS. 1A and 1B and the modules 202, 204, 206, and 208 of FIG. 2 have been described as circuitry or a combination of circuitry and executable instructions. Such components may be implemented in a number of fashions.

Looking at FIG. 2, the executable instructions may be processor-executable instructions, such as program instructions, stored on the memory resource 220, which is a tangible, non-transitory computer-readable storage medium, and the circuitry may be electronic circuitry, such as processor resource 222, for executing those instructions. The instructions residing on the memory resource 220 may comprise any set of instructions to be executed directly (such as machine code) or indirectly (such as a script) by the processor resource 222.

Figure 6:
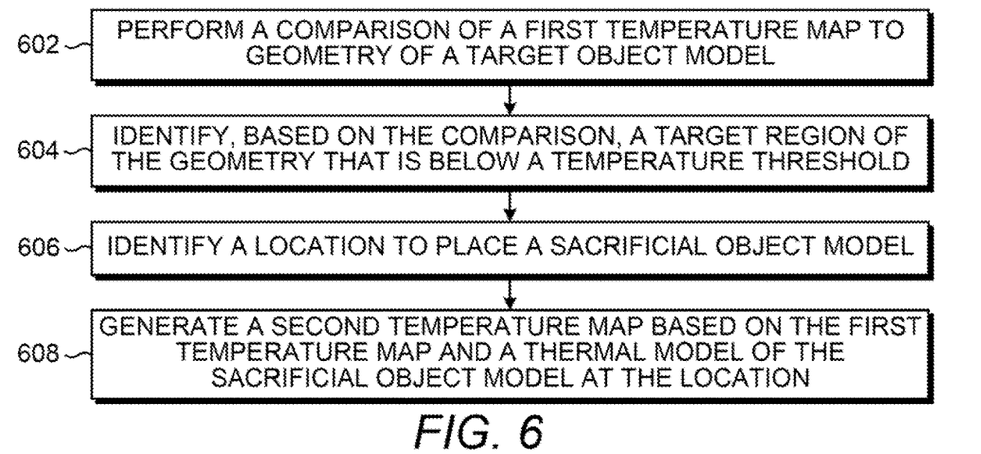
FIGS. 6-8 are flow diagrams depicting example methods for temperature adjustment of a print device environment.
Figure 7:
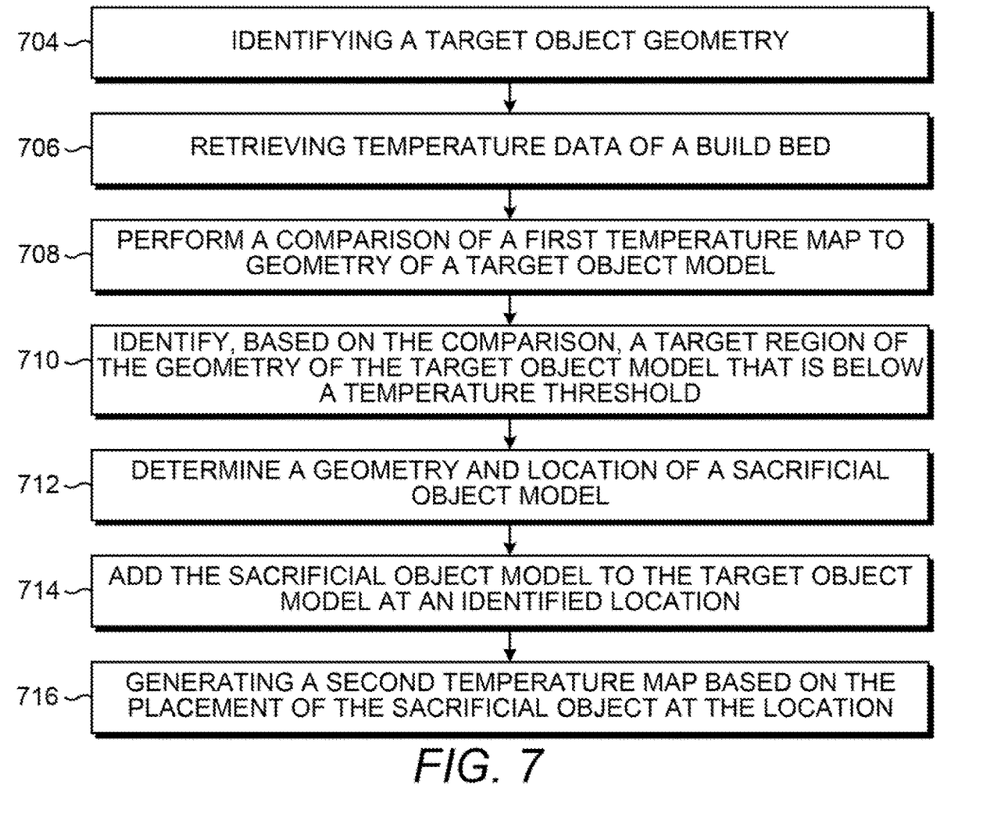
Figure 8:
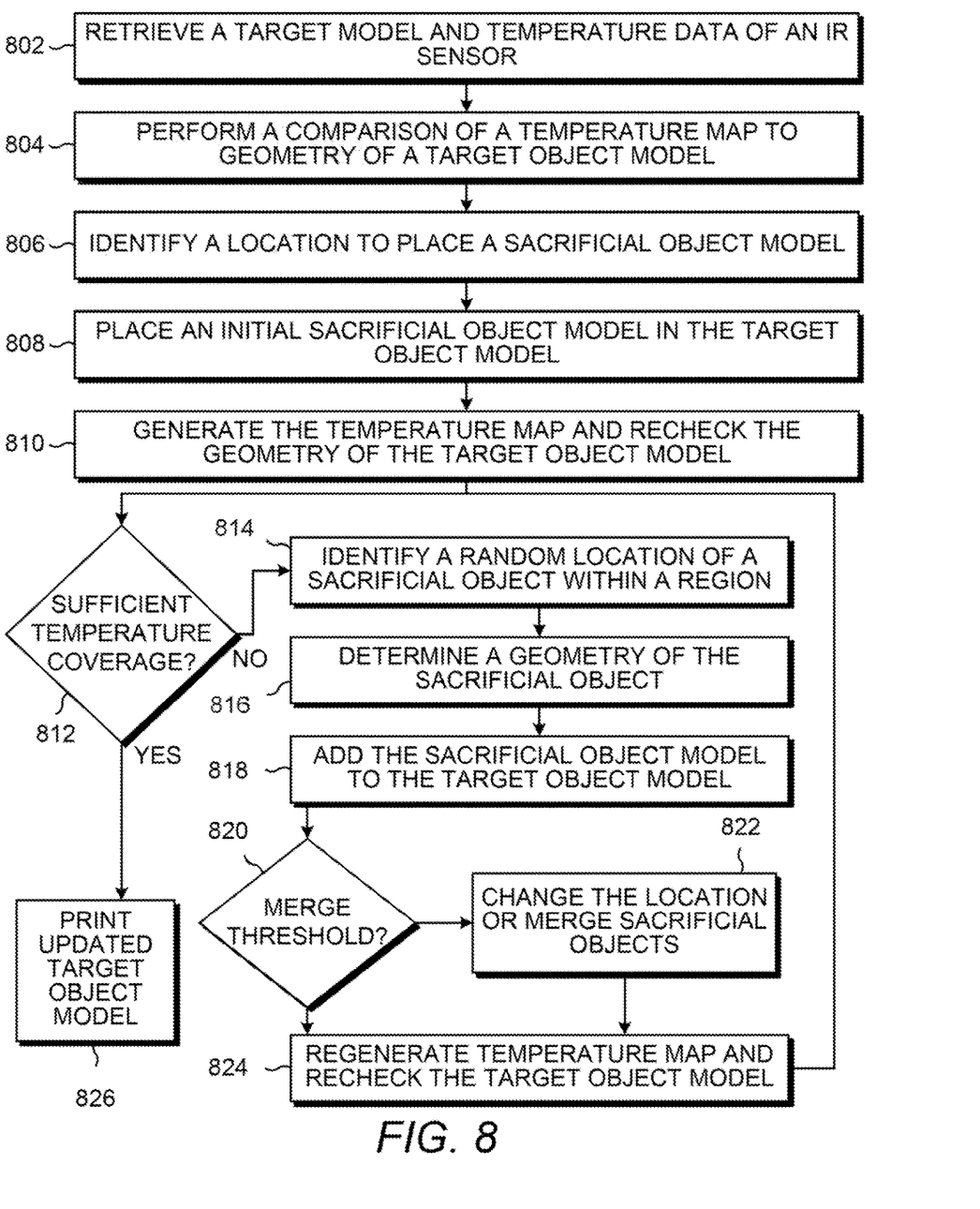

In some examples, the system 200 includes the executable instructions may be part of an installation package that when installed may be executed by the processor resource 222 to perform operations of the system 200, such as methods described with regards to FIGS. 6-8. In that example, the memory resource 220 may be a portable medium such as a compact disc, a digital video disc, a flash drive, or memory maintained by a computer device, such as a service device 334 of FIG. 3, from which the installation package may be downloaded and installed. In another example, the executable instructions may be part of an application or applications already installed. The memory resource 220 may be a non-volatile memory resource such as read-only memory (ROM), a volatile memory resource such as random access memory (RAM), a storage device, or a combination thereof. Example forms of a memory resource 220 include static RAM (SRAM), dynamic RAM (DRAM), electrically erasable programmable ROM (EEPROM), flash memory, or the like. The memory resource 220 may include integrated memory such as a hard drive (HD), a solid state drive (SSD), or an optical drive.

FIG. 3 depicts example computing environments 390 in which various example systems 300 for temperature adjustment of a print device environment may be implemented. The system 300 (described herein with respect to FIGS. 1A, 1B, and 2) may represent generally any circuitry or combination of circuitry and executable instructions to adjust the temperature of a print device environment by using a sacrificial object. The system 300 may include a target engine 302, a thermal engine 304, a sacrificial object engine 306, and a print engine 308 that are the same as the target engine 102, the thermal engine 104, the sacrificial object engine 106, and the print engine 108 of FIG. 1B, respectively, and the associated descriptions are not repeated for brevity. As shown in FIG. 2, the engines 202, 204, 206, and 208 may be integrated into a compute device, such as a print device 346 or a service device 334 of FIG. 3, or, as shown in FIG. 3, an example system 300 for temperature adjustment of a print device environment which may be remote or otherwise distributed from the print device 346. For example, a data store 310 may contain the target object model 340, the sacrificial object model 342, and the temperature map 344 on a network 330 that is separate from the engines 302-308 of the system 300. The engines 302, 304, 306, and 308 may be integrated via circuitry or as installed instructions into a memory resource of the compute device.

The example computing environment 390 may include compute devices, such as service devices 334 and user devices 336. The service devices 334 represent generally any compute devices to respond to a network request received from a user device 336, whether virtual or real. For example, the service device 334 may operate a combination of circuitry and executable instructions to provide a network packet in response to a request for a page or functionality of an application. The user devices 336 represent generally any compute devices to communicate a network request and receive and/or process the corresponding responses. For example, a browser application may be installed on the user device 336 to receive the network packet from the service device 334 and utilize the payload of the packet to display an element of a page via the browser application.

The compute devices may be located on separate networks 330 or part of the same network 330. The example computing environment 390 may include any appropriate number of networks 330 and any number of the networks 330 may include a cloud compute environment. A cloud compute environment may include a virtual shared pool of compute resources. For example, networks 330 may be distributed networks comprising virtual computing resources. Any appropriate combination of the system 300 and compute devices may be a virtual instance of a resource of a virtual shared pool of resources. The engines and/or modules of the system 300 herein may reside and/or execute "on the cloud" (e.g., reside and/or execute on a virtual shared pool of resources).

A link 338 generally represents one or a combination of a cable, wireless connection, fiber optic connection, or remote connections via a telecommunications link, an infrared link, a radio frequency link, or any other connectors of systems that provide electronic communication. The link 338 may include, at least in part, intranet, the Internet, or a combination of both. The link 338 may also include intermediate proxies, routers, switches, load balancers, and the like.

Referring to FIGS. 1-3, the engines 102, 104, 106, and 108 of FIGS. 1A and 1B and/or the modules 202, 204, 206, and 208 of FIG. 2 may be distributed across devices 334, 336, or a combination thereof. The engines and/or modules may complete or assist completion of operations performed in describing another engine and/or module. Thus, although the various engines and modules are shown as separate engines in FIGS. 1A, 1B, and 2, in other implementations, the functionality of multiple engines and/or modules may be implemented as a single engine and/or module or divided in a variety of engines and/or modules. In some example, the engines of the system 300 may perform example methods described with regards to FIGS. 4, 6-8.

Whether integrated into a single device or distributed across devices, the components of the systems 100, 200, 300, may operate and interact in a similar fashion. FIG. 4 depicts example operations used to implement example systems 400 for temperature adjustment of a print device environment. Referring to FIG. 4, the example engines of FIG. 4 generally include a target engine 402, a thermal engine 404, a sacrificial object engine 406, and a print engine 408 that may represent the target engine 102, the thermal engine 104, the sacrificial object engine 106, and the print engine of 108 of FIG. 1B, for example. The example engines of FIG. 4 may be implemented on a compute device, such as the print device 246 of FIG. 2, a service device 334 of FIG. 3, or a combination of compute devices.

For example, in response to a print job request 460, the target engine 402 may receive a build bed geometry 462 and a target object model 440 and may identify the geometry of the target object model 440 as it would lay on the build bed of the print device, discussed as the target region herein. Also in response to the print job request 460, the thermal engine 404 may receive a temperature threshold 464 and model a temperature map 444 to identify a region of the build bed that is below the temperature threshold 464. For example, the thermal engine 404 may comprise program instructions, such as the level module 456 and a map generator module 458, that when executed by a processor resource cause the processor resource to identify a threshold level at a target region and generate a temperature map 444, respectively. The modeled temperature data may be verified by the thermal engine 404 with IR sensor data 466 received from a camera device of the print device where the camera device includes an IR sensor.

The sacrificial object engine 406 may comprise program instructions, such as an overlay module 448 and a comparison module 450 that when executed by a processor resource cause the processor resource to facilitate identification of a sacrificial object region by overlaying the temperature map 444 on the target object geometry 468 and performing a comparison of the temperature threshold 464 to the target region to identify a sacrificial object region as well as an object location within the sacrificial object region. The sacrificial object engine 406 may also comprise program instructions, such as the part geometry module 452 and the aggregator module 454, that when executed by a processor resource cause the processor resource to facilitate adding a sacrificial object by selecting a sacrificial object geometry from a plurality of sacrificial object geometries 470 to place within the sacrificial object region and combining the sacrificial object model with the target object model in preparation for rasterization and layer slicing. The print engine 408 may cause the updated model 472 (or plurality of updated models when the sacrificial objects are being added during production) to be printed by the print device using print operations 474.

Figure 5A:
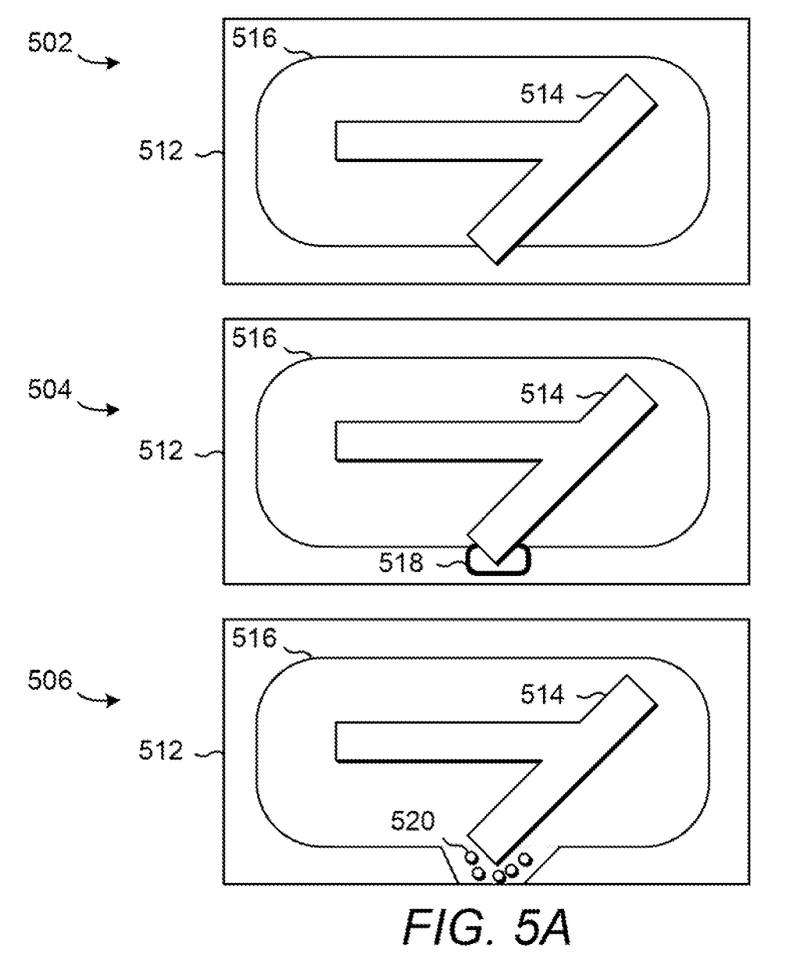
FIGS. 5A-D depict example object models as appearing on an example build bed during example states of operations of an example system for temperature adjustment of a print device environment.
Figure 5B:
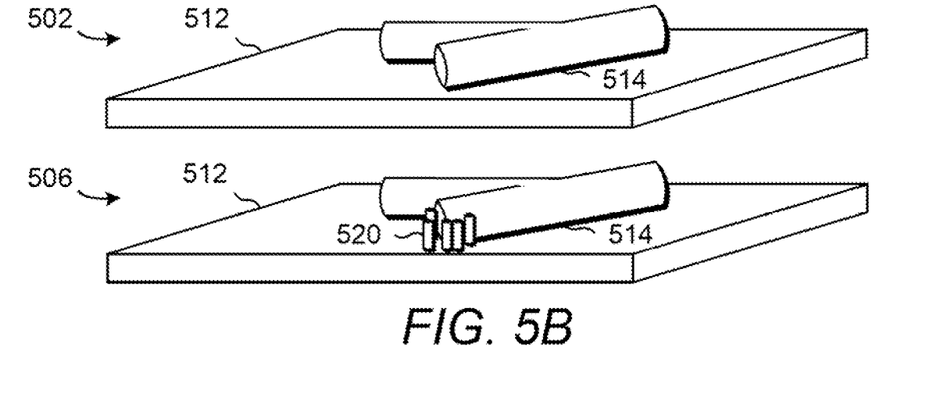
Figure 5C:
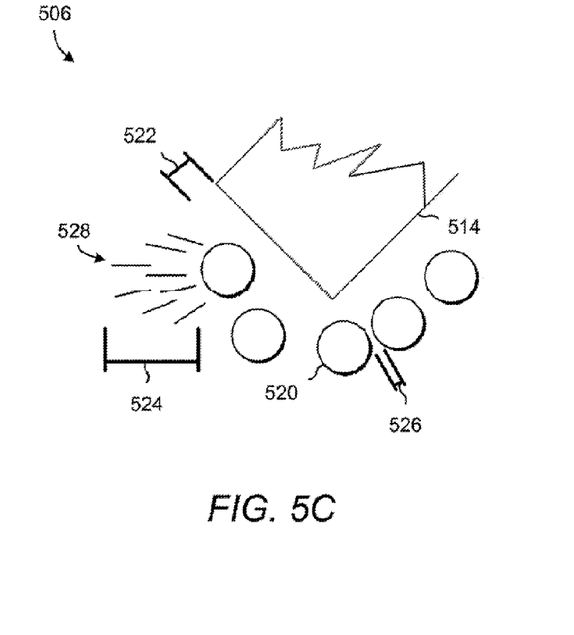
Figure 5D:
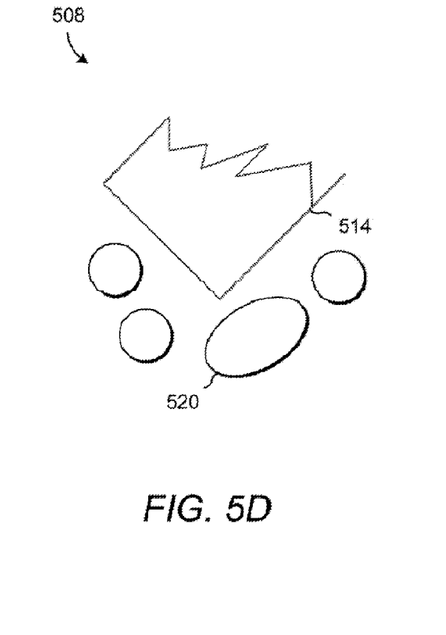

FIGS. 5A-D depict example object models as appearing on an example build bed during example states of operations of an example system for temperature adjustment of a print device environment. FIGS. 5A and 5B depict example states 502-506 of the system during the process of adding sacrificial objects, where FIG. 5A depicts a top view and FIG. 5B depicts a perspective view of states before and after the sacrificial objects are added to the model data. State 502 depicts a target object model 514 position on a build bed 512 with an overlay of the temperature map having a temperature level threshold region 516 showing the area of the build bed that is at least the temperature of the temperature threshold discussed herein. State 504 depicts the identification of a target region 518 that includes a portion of the target object 514 outside the temperature level threshold region 516 of the temperature map. State 506 depicts the aggregation of sacrificial objects 520 at the sacrificial object region to the print job and a change in the temperature level threshold region 516 is shown around the sacrificial objects 520.

FIG. 5C depicts state 506 at the target region and the distances involved in the determination of the location of the sacrificial objects. The overlap distance 522 depicts the minimum distance that the sacrificial object 520 may be placed without affecting the geometry of the target object 514. An example overlap distance threshold 522 may be about 0.5 mm depending on the print material. The heat dissipation distance 524 depicts a distance at which a sacrificial object 520 emits heat 528 that may affect the temperature surrounding the sacrificial object. The merge distance 526 depicts a maximum distance between sacrificial objects 520 at which the sacrificial object should be merged and considered as one sacrificial object. For example, a merge distance threshold may be about 0.3 mm depending on the print material. The thresholds associated with the distances 522, 524, and 526 are based on the thermal properties of the print material used by the print device.

FIG. 5D depicts state 508 where the two sacrificial objects have been merged into a single sacrificial object 520 because the merge distance threshold was satisfied. State 508 is discussed as the model data of the target object and the sacrificial object and also represents how an object would be printed by a print device. For example, a printed article may comprise the object depicted in state 506 which includes a target object formed of a print material used by a print device and a sacrificial object formed of the same print material, wherein the sacrificial object is printed by the print device within a distance range between a first distance from the target object based on a melting point of the print material and a crystallization point of the print material and a second distance from the target object within a heat dissipation range of the sacrificial object having a production temperature when printed by the print device. The heat dissipation range comprises distances from which the print material at the production temperature dissipates heat (e.g., transfers heat) to affect a thermal background of the target object, depicted as heat 528 in FIG. 5C. The thermal background comprises a print device environment surrounding the target object. The printed article may be formed by a print device, such as a 3D object forming device.

FIGS. 6-8 are flow diagrams depicting example methods for temperature adjustment of a print device environment. Referring to FIG. 6, example methods for temperature adjustment of a print device environment may generally comprise performing a comparison of a first temperature map to geometry of a target object model, identifying a target region of the geometry of the target object model that is below a temperature threshold based on a first temperature map, identifying a location to place a sacrificial object model that is at least an overlap threshold distance from the geometry of the target object model, and generating a second temperature map based on the first temperature map and a thermal model of the sacrificial object model at the location. The method of FIG. 6 may be performed by a system for temperature adjustment of a print device environment. For example, the sacrificial object engine 106 may perform the comparison, identify the target region that is below the temperature threshold, and identify the location to place the sacrificial object, and the thermal engine 104 may generate the first temperature map and second temperature map.

At block 602, a comparison of a first temperature map to geometry of a target object model is performed by a processor resource, such as a processor resource of a sacrificial object engine of a print device, such as the processor resource 222 when executing the sacrificial object model 206 of FIG. 2. The target object model, as discussed herein, comprises a data representing a 3D object to be built in a build volume to form a target object.

At block 604, a target region of the geometry of the target object model is identified based on the comparison at block 602 using the first temperature map. The target region identified at block 604 is below the temperature threshold that allows the target object to cool properly determined by a thermal property of the print material. At block 606, a location to place a sacrificial object model is identified. The location is determined by a sacrificial object engine, such as sacrificial object engine 106 of FIGS. 1A and 1B, to be at least an overlap threshold distance from the geometry of the target object model. As discussed herein, the sacrificial object model comprises data representing a 3D object to be built in the build volume to form a sacrificial object that is separate from the target object.

At block 608, a second temperature map is generated. The second temperature map may be generated by a thermal engine, such as thermal engine 104 of FIGS. 1A and 1B, based on the first temperature map and a thermal model of the sacrificial object model at the location. In this manner, the additional heat provided by the sacrificial object may be predicted at the model stage prior to rasterization and slicing the 3D model data as to allow the sacrificial object model to be added to the print job, such as by adding the sacrificial object model data to the target object model data. The second temperature map may then be used to verify that the temperature of the print environment is sufficiently uniform to continue the print job or if additional sacrificial objects are to be added to improve the thermal background of the build bed.

FIG. 7 includes blocks similar to blocks of FIG. 6 and provides additional blocks and details. In particular, FIG. 7 depicts additional blocks and details generally regarding identifying a target geometry, retrieving temperature data of a build bed, determine a geometry of a sacrificial object model, and adding the sacrificial object model to the target object model. Blocks 708, 710, 712, and 716 are similar to blocks 602, 604, 606, and 608 of FIG. 6 and, for brevity, their respective descriptions are not repeated their entirety. Similar to FIG. 6, the method of FIG. 7 may be performed by a system for temperature adjustment of a print device environment.

At block 704, a target object geometry is identified. For example, the geometry of the target object is identified by a target engine, such as the target engine 102 of FIG. 1, using the target object model, as well as the position of the model on the build bed. Temperature data of the build bed is retrieved at block 706, such as by a thermal engine 104 of FIGS. 1A and 1B, to verify the comparison of the first temperature map.

At block 712, geometry of the sacrificial object is determined. The geometry of the sacrificial object model may be determined via a sacrificial object engine (such as the sacrificial object engine 106 of FIGS. 1A and 1B) by at least one of selecting a random predetermined geometry of a plurality of predetermined geometries and identifying a perimeter of a sacrificial object region that comprises an area that encompasses a portion of the target object model that is outside the temperature threshold on the temperature map within a heat dissipation threshold distance from the target object model. For example, the geometry may be a rectangle of print material surrounding the sacrificial object region, which may be placeable on a powder bed layer below and/or prior to any layers of the target object being built. In that example, an overlap in the target object geometry and the sacrificial object geometry may be allowed on the x-axis or y-axis as long as the distance between the target object and the sacrificial object satisfy the overlap distance threshold on the z-axis. The sacrificial object model is added to the target object model at the identified location at block 714. Adding the sacrificial object model to the target object model may be performed by a sacrificial object engine, such as the sacrificial object engine 106 of FIGS. 1A and 1B, and include operations such as inserting data into an electronic file containing the target object data representation, including an additional electronic file with the target object data file, providing insertion metadata with the print job, or some other form of aggregation of data or combination thereof.

FIG. 8 represents yet another example of a method for temperature adjustment of a print device environment using sacrificial objects. FIG. 8 includes blocks similar to blocks of FIGS. 6 and 7 and provides additional blocks and details. In particular, FIG. 8 depicts additional blocks and details generally regarding placing an initial sacrificial object model, generating temperature maps, iteratively adding sacrificial objects, merging or changing object locations, and printing the updated target object model. Blocks 802 and 804 are similar to blocks 702-708 of FIG. 7 and block 806 is similar to block 606 of FIG. 6, for brevity, their respective descriptions are not repeated their entirety. Similar to FIGS. 6 and 7, the method of FIG. 8 may be performed by a system for temperature adjustment of a print device environment.

At block 808, an initial sacrificial object is placed in the target object model. As discussed herein, the initial sacrificial object may be placed by a sacrificial object engine at an initial layer, for example, prior to any layers having a portion of the target object model. In such a manner, a foundational layer may be used to place initial sacrificial objects in and/or around sacrificial object regions without affecting the target object model layer information other than adding an additional layer. The temperature map is regenerated at block 810 and the geometry of the target object model is rechecked to determine whether any of the target object model is outside a threshold temperature level as identified by a thermal model, such as an FEM simulation model. The regeneration of a temperature map may be performed by a thermal engine, such as the thermal engine 104 of FIGS. 1A and 1B and the rechecking (i.e., verification operation) may be performed by a sacrificial object engine, such as the sacrificial object engine 106 of FIGS. 1A and 1B.

A determination as to whether there is sufficient temperature coverage for the target object is made at block 812. The determination may be performed by the thermal engine, a sacrificial object engine, or a combination thereof. If there is not sufficient temperature coverage over the target object model, then an iterative process of placing supplement sacrificial object models begins until the target object model is completely within a temperature threshold level of the temperature map (or a maximum number of iterations are performed). At block 814, the iterative process may begin with identification of random location within a sacrificial object region for a sacrificial object, such as using a Monte-Carlo sampling technique. The geometry of the sacrificial object is determined at block 816, and the sacrificial object model is added to the target object model at 818.

A determination as to whether a merge threshold is satisfied is made at block 820. If a merge threshold is met (e.g., a plurality of sacrificial objects are too near each other), a change in the location of a sacrificial object is made or a first sacrificial object is merged with a second sacrificial object at block 822. The determination to change the location or merge the sacrificial objects may be made based on a comparison of the temperature map, the geometry of the target object model, and a location of the plurality of sacrificial object models, such as by determining where a low concentration of sacrificial objects with respect to the target object model and the changes to the temperature map.

At block 824, the temperature map is regenerated and the target object model is checked again to identify whether the iterations should continue. Once a sufficient temperature coverage is identified at block 812 (or a maximum number of iterations are performed), an updated target object model is printed by the print device at block 826. The iterative process discussed herein may be performed by a sacrificial object engine, such as sacrificial object engine 106 of FIGS. 1A and 1B. The iterative process discussed herein may be based on a target optimization of an average distance between the supplemental sacrificial object models and the target object model, where the thickness of the supplemental sacrificial object models and the minimum distance between the supplemental sacrificial object models and the target model are considered. The average distance of the target optimization function is associated with an energy production level of the supplement sacrificial object models during production, which is affected by the properties of the print material and the temperature at which the print material is discharged during production.

Although the flow diagrams of FIGS. 4 and 6-8 illustrate specific orders of execution, the order of execution may differ from that which is illustrated. For example, the order of execution of the blocks may be scrambled relative to the order shown. Also, the blocks shown in succession may be executed concurrently or with partial concurrence. All such variations are within the scope of the present description.

All of the features disclosed in this specification (including any accompanying claims, abstract and drawings), and/or all of the elements of any method or process so disclosed, may be combined in any combination, except combinations where at least some of such features and/or elements are mutually exclusive.

The present description has been shown and described with reference to the foregoing examples. It is understood, however, that other forms, details, and examples may be made without departing from the spirit and scope of the following claims. The use of the words "first," "second," or related terms in the claims are not used to limit the claim elements to an order or location, but are merely used to distinguish separate claim elements.

What is claimed is:

1. A system comprising:
   a target engine to identify a target region of a build bed of a print device, wherein a target object is to be produced through application of a print material on build material powder in the target region of the build bed;
   a thermal engine to identify a temperature level of the target region, the temperature level comprising a predicted temperature during production of the target object by the print device; and
   a sacrificial object engine to identify an object location at which the print device is to apply the print material onto build material powder in the build bed to build a sacrificial object in response to a determination that the temperature level of the target region is deficient to achieve a temperature threshold for production of the target object, the temperature threshold associated with a thermal property of the print material, and the sacrificial object to provide heat to the target region to raise the temperature level of the target region.

2. The system of claim 1, wherein:
   the temperature threshold comprises a target temperature range that depends on a melting point of the print material and a crystallization point of the print material;
   the thermal engine generates a temperature map of the build bed using temperature data from a thermal model function, where the temperature data comprises a predicted surface temperature of the build bed; and
   the sacrificial object engine:
      compares the temperature map to the target region;
      identifies a sacrificial object region comprising a difference between the target region and a temperature level area of the temperature map within the temperature threshold, the target region being within the sacrificial object region; and
      increases the sacrificial object region by an environmental factor.

3. The system of claim 2, wherein:
   the sacrificial object engine:
      receives sacrificial object geometry information including a plurality of object geometries;
      performs a finite element method (FEM) simulation to generate the temperature map;
      sets constraints for a simulated annealing operation that identifies a solution of sacrificial parts to achieve the temperature threshold in the target region; and
      iteratively perform FEM simulation updates and simulated annealing operations until at least one of the sacrificial object region achieves the temperature threshold and a number of iterations are performed, the simulated annealing operations to identify object locations for sacrificial objects and the FEM simulation updates to modify the temperature map based on the sacrificial objects added by the simulated annealing operations.

4. The system of claim 3, wherein:
   the object location is a randomly selected location within the sacrificial object region; and
   a first sacrificial object is merged with a second sacrificial object when a distance between a first sacrificial object and a second sacrificial object satisfy a merge distance threshold that represents a first distance at which a plurality of objects are to be merged.

5. The system of claim 3, wherein the object location is a second distance from the target object to satisfy an overlap distance threshold that is a minimum distance between the sacrificial object and the target object without merging the sacrificial object and the target object based on the melting point of the print material.

6. The system of claim 3, wherein the plurality of object geometries include a bar and a plate, the bar representing a line of print material of a predetermined length and the plate representing a circular object of a predetermined diameter with a filled-in interior.

7. The system of claim 1, comprising:
   a print engine to:
      cause actuation of a marking device of the print device to the object location;
      cause placement of an amount of the print material at the object location to form the sacrificial object; and
      cause application of energy to the object location to create the sacrificial object, the sacrificial object made of a same print material as the target object.

8. The system of claim 7, wherein:
   the thermal engine measures actual temperature data at a surface area of the build bed using an infrared sensor to verify modeled temperature data to predict the temperature level;
   the sacrificial object engine adds sacrificial object model data to target object model data before slicing the target object model to prepare for printing the target object; and
   the print engine causes a printed article to be formed:
      outside a temperature level threshold region based on a fusion property associated with a melting point of the print material and a crystallization point of the print material;
      outside an overlap distance threshold from the target object that exceeds a first distance where the sacrificial object and the target object would fuse together during production; and
      within a heat dissipation range of the sacrificial object that allows heat of the sacrificial object to affect a temperature of the target object model.

9. The system of claim 1, wherein the sacrificial object engine:
   defines a domain of possible object locations; and
   at least one of:
      merges any of a plurality of sacrificial object models that achieve a merge distance threshold; and changes an object location of the sacrificial object when a merge distance threshold is achieved.

10. A three-dimensional (3D) object forming device comprising a machine-readable medium comprising executable instructions that when executed by a processor resource of the 3D object forming device cause the 3D object forming device to:
generate a target object formed of a print material of the 3D object forming device; and
generate a sacrificial object formed of the print material within a distance range between:
a first distance from the target object based on a melting point of the print material and a crystallization point of the print material; and
a second distance from the target object within a heat dissipation range of the sacrificial object having a production temperature when printed by the 3D object forming device, the heat dissipation range comprising distances from which the print material at the production temperature dissipates heat to affect a thermal background of the target object, the thermal background comprising a print device environment surrounding the target object.

11. A method for temperature adjustment of a print device environment comprising:
performing, using a processor resource, a comparison of a first temperature map to a geometry of a target object model, the target object model comprising a first data representing a first three-dimensional (3D) object to be built using a print material applied to build material powder in a build volume to form a target object;
identifying, based on the comparison, a target region of the geometry of the target object model that is below a temperature threshold based on the first temperature map;
identifying a location to place a sacrificial object model that is at least an overlap threshold distance from the geometry of the target object model, the sacrificial object model comprising a second data representing a second 3D object to be built through application of the print material onto build material powder in the build volume to form a sacrificial object that is separate from the target object, the sacrificial object to provide heat to the target region and raise a temperature of the target region; and
generating a second temperature map based on the first temperature map and a thermal model of the sacrificial object model at the identified location.

12. The method of claim 11, comprising:
determining a geometry of the sacrificial object model by at least one of:
selecting a random predetermined geometry of a plurality of predetermined geometries; and
identifying a perimeter of a sacrificial object region that comprises an area that encompasses a portion of the target object model that is outside the temperature threshold on the temperature map within a heat dissipation threshold distance from the target object model.

13. The method of claim 11, comprising:
placing an initial sacrificial object model within the first data; and
iteratively placing supplemental sacrificial object models within the sacrificial object region until the target object model is completely within a temperature threshold level of the temperature map or a maximum number of iterations are performed.

14. The method of claim 13, wherein:
the iteratively placing supplemental sacrificial object models is based on a target optimization of an average distance between the supplemental sacrificial object models and the target object model, a thickness of the supplemental sacrificial object models, and a minimum distance between the supplemental sacrificial object models and the target object model, where the average distance is associated with an energy production level of the supplement sacrificial object models during production.

15. The method of claim 11, comprising:
changing a location of a first sacrificial object of a plurality of sacrificial objects based on a comparison of the temperature map, the geometry of the target object model, and a location of a second sacrificial object model.

* * * * *